United States Patent

Chertok

[15] 3,662,354

[45] May 9, 1972

[54] INSCRIBING DIGITAL DATA ON A GROOVED RECORD BY PRE-DISTORTING THE WAVEFORMS

[72] Inventor: Allan B. Chertok, Bedford, Mass.

[73] Assignee: EG & G Inc., Bedford, Mass.

[22] Filed: June 1, 1970

[21] Appl. No.: 42,149

[52] U.S. Cl. ..............340/173 R, 179/100.4 C, 179/100.4 E, 340/173 SP

[51] Int. Cl. ....................................G11b 3/00, G11c 13/00

[58] Field of Search ......................340/173 R, 173 SP; 274/3; 179/100.4 R, 100.4 C, 100.4 E

[56] References Cited

UNITED STATES PATENTS

| | | | |
|---|---|---|---|
| 2,281,405 | 4/1942 | Barrish | 179/100.4 E |
| 3,229,048 | 1/1966 | Fox | 179/100.4 C |
| 3,246,085 | 4/1966 | Rabinow | 179/100.1 |
| 3,388,330 | 6/1968 | Kretzmer | 325/42 |
| 3,440,361 | 4/1969 | Batchelor | 179/100.4 C |

OTHER PUBLICATIONS

H. C. Talcott, Technical Concepts of Data Transmission, Data Communications, Telephony Publishing Co., 608 South Dearborn St., Chicago, Ill.

*Primary Examiner*—Bernard Konick
*Assistant Examiner*—Stuart Hecker
*Attorney*—Kenway, Jenney & Hildreth and Ralph L. Cadwallader

[57] ABSTRACT

A method for inscribing waveforms representing digital data on a phonograph disk, introducing pre-distortion into the waveforms by passing them through a transversal equalizer before they are applied to the cutting lathe. The transversal equalizer is adjusted by inscribing test waveforms without equalization on a disk, regenerating the waveforms from the disk through a standardized play back system and passing the regenerated waveforms through the equalizer to a monitor. The equalizer is then adjusted to optimize patterns of the regenerated waveforms.

7 Claims, 17 Drawing Figures

INVENTOR
ALLAN B. CHERTOK
BY Kenway, Jenney & Hildreth
Ralph L. Cadwallader
ATTORNEYS INVENTOR
ALLAN B. CHERTOK
BY Kenway, Jenney & Hildreth
Ralph L. Cadwallader
ATTORNEYS INVENTOR
ALLAN B. CHERTOK
BY Kenway, Jenney & Hildreth
Ralph L. Cadwallader
ATTORNEYS INVENTOR
ALLAN B. CHERTOK
BY Kenway, Jenney & Hildreth
Ralph L. Cadwallader
ATTORNEYS INVENTOR
ALLAN B. CHERTOK
BY Kenway, Jenney & Hildreth
Ralph L. Cadwallader
ATTORNEYS INVENTOR
ALLAN B. CHERTOK
BY Kenway, Jenney & Hildreth
Ralph L. Cadwallader
ATTORNEYS INVENTOR
ALLAN B. CHERTOK
BY Kenway, Jenney & Hildreth
Ralph L. Cadwallader
ATTORNEYS INVENTOR
ALLAN B. CHERTOK
BY Kenway, Jenney & Hildreth
Ralph L. Cadwallader
ATTORNEYS

INSCRIBING DIGITAL DATA ON A GROOVED RECORD BY PRE-DISTORTING THE WAVEFORMS

FIELD OF THE INVENTION

This invention relates in general to a method for storing digital data and more particularly to a method for inscribing a modulated groove on a phonograph record, the modulations representing a train of digital data.

BACKGROUND OF THE INVENTION

A technique and apparatus for using a phonograph disk as a random access memory for storage and retrieval of digitally coded information is described in pending application Ser. No. 817,068 filed Apr. 17, 1969 assigned to the assignee of this application. A method and apparatus for converting the digital data to be stored into a series of superposed symbols and for inscribing this series of superposed symbols together with a clock signal on a record is described in pending application Ser. No. 788,441 filed Jan. 2, 1969, also assigned to the assignee of this application. In general the series of digital signals to be stored on the record medium is converted into a series of waveforms of known characteristics in both the time domain and the frequency domain and these electrical waveforms are applied as a driving signal to a phonograph cutting lathe. The lathe converts the driving electrical signals into transverse modulations of a spiral groove being cut in the record. In order to retrieve the information so stored, a phonograph stylus is arranged to track along the spiral groove and, with appropriate converting electronics, this reproduces the electrical waveforms which originally drove the cutter. Decoding circuitry converts the series of waveforms back into the digital signals by determining the amplitude levels of the waveform at precise time intervals related to the clock signal inscribed in the groove.

The accuracy of reproduction of the original digital signal train depends upon the precision with which the electrical waveform generated to represent the original digital signal train can be regenerated from the information inscribed upon the record disk. Since the digital data is stored on the disk with high spatial density, typically $2\times10^3$ bits per inch, precise control of the waveform in the time domain is needed. The accuracy also depends upon the capability of the decoding circuitry to determine the amplitude, at precise times, of the waveform produced from the record disk. There are a number of factors which may introduce distortion into the waveform produced by the stylus tracking along an inscribed groove. These include distortion of the waveform producing both clock phase and amplitude errors. This distortion may, for example, be introduced by the limitations of the readout and recording process. This process involves the conversion of a train of digital signals to a series of electrical analog waveforms and thence to a physically modulated groove on a record followed by reconversion to an electrical analog and thence to a digital series. The "system" then includes not only the controlled cutting apparatus but also a standardized phonograph playback unit. Some distortion in the initial conversion of the electrical signals into modulations of the record groove is intentionally introduced to improve some aspects of the system performance. One such distortion is the boost of low frequency components in order to complement the attenuation of low frequencies by a rumble filter in the playback unit. Such distortions are then compensated for in the design of the system. Other unintended distortions are, however, also introduced by deviation from phase linearity and amplitude uniformity of some of the elements in the system. Compensation for such distortions is not readily incorporated in the system design.

SUMMARY OF THE INVENTION

Broadly speaking, in the method of this invention a modulated groove is inscribed on a memory disk, utilizing a technique in which the electrical signal for driving the cutting lathe is generated from a digital train as a series of superposed waveforms which are distorted in a controlled fashion before being applied to the cutting lathe. This distortion is such that it pre-compensates for one class of distortions which will be introduced in the cutting or readout process. In this class, distortions introduced in the cutting or readout process are linear and may be analyzed as leading and lagging echoes of the undistorted signals, the echoes having varying amplitudes and polarities. The controlled pre-distortion is achieved by passing the waveforms through a linear transversal equalizer before they are applied to the cutting lathe. The linear transversal equalizer is adjusted to provide compensating echoes of equal amplitude but opposite in polarity to the echoes that the distortion introduces. The process requires a step in which the linear transversal equalizer is adjusted by employing the stylus and playback equipment that would be used to read out the memory disk, to regenerate an electrical signal from a test disk. The test disk is produced by recording waveforms representing a pseudo random source of digital data without using the transversal equalizer. This regenerated electrical signal is then passed through the transversal equalizer and the resulting signal waveform pattern is then optimized by adjusting the transversal equalizer. In the cutting step this equalizer with these adjustments maintained is inserted in the signal processing system to transmit the signals being generated from the digital data source to the cutting lathe.

DESCRIPTION OF PREFERRED EMBODIMENTS

To inscribe digital data on a record disk in accordance with the principals of this invention, a digital data train is first converted to a series of superposed electrical symbols. The particular form of the waveform used to constitute the symbol will depend upon the data storage requirements and the limitations of the record cutting and playback system. For a high density storage requirement in an apparatus which uses the conventional playback stylus, one suitable waveform is described in U.S. Pat. application Ser. No. 788,441. In the time domain this signal has the form, $$S(t)=1/2\left[\frac{\sin \pi(T+t)}{\pi(T-t)}-\frac{\sin \pi(T-t)}{\pi(T-t)}\right]$$

wherein $t$ = the instantaneous time and $T$ = the interval between the superposed symbols. The decoding of a series of these superposed symbols can be accomplished by determining whether the signal amplitude at each interval T should be categorized as a zero level of a ±1 level. This can be accomplished with a two level amplitude slicer providing an output indicating whether the waveform amplitude falls within or without the windows defined by the zero level and +1 level and zero level and −1 level.

Figure 1:
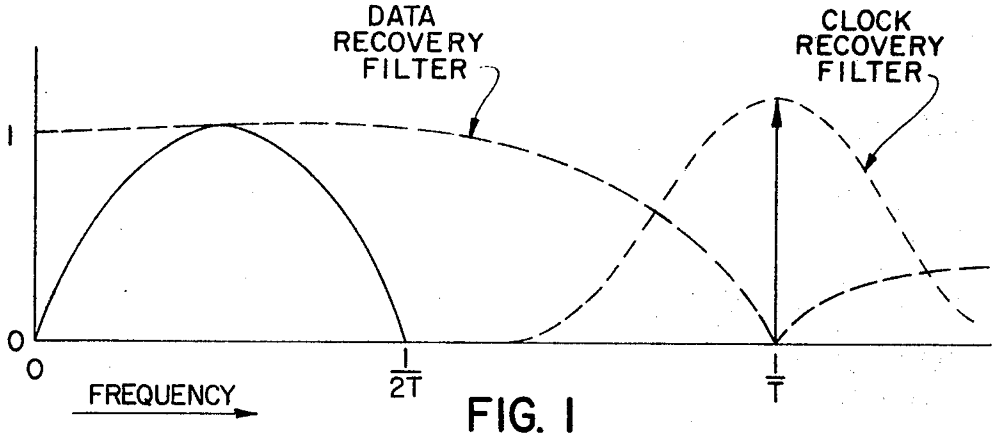
FIG. 1 is an illustration in graphical form of the frequency spectrum of a data waveform symbol useful in a preferred embodiment of this invention in combination with a clock signal.

In the frequency domain, the spectrum of this symbol extends from zero to a frequency, $1/2T$ with a generally symmetrical shape. Since the data rate $F_D$ is equal to $1/T$, the maximum frequency of the data signal spectrum is $F_D/2$. A clock sinusoid at a frequency twice as high as the maximum frequency of the data signal, that is, at a frequency $F_D$ can be effectively separated by conventional filter techniques. In FIG. 1 there is illustrated the frequency spectrum for the data signal and the clock signal. The dotted lines in FIG. 1 are illustrative of typical filter characteristics which would be employed with these waveforms.

Figure 2:
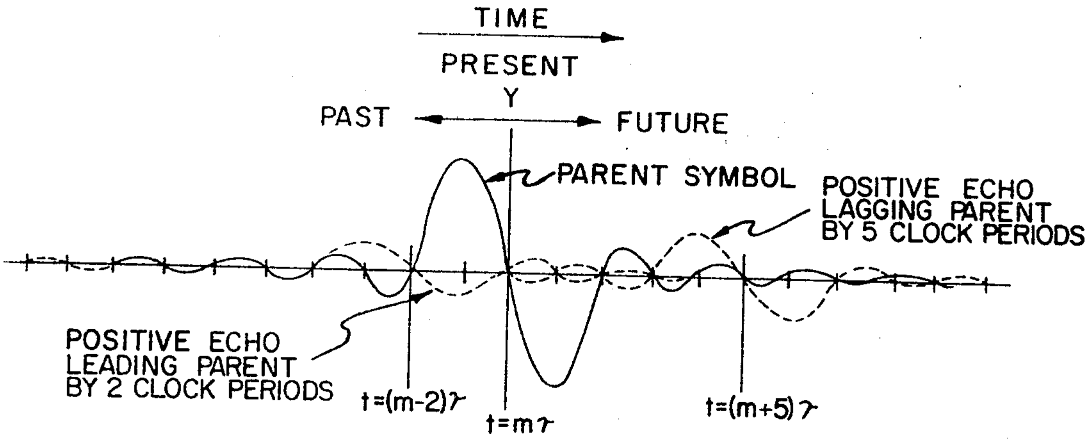
FIG. 2 is an illustration in graphical form of a data waveform symbol in the time domain useful in a preferred embodiment of this invention.

In FIG. 2 there is illustrated this waveform in the time domain. In this figure, distortion echoes are illustrated by the dotted line curves.

Figure 3:
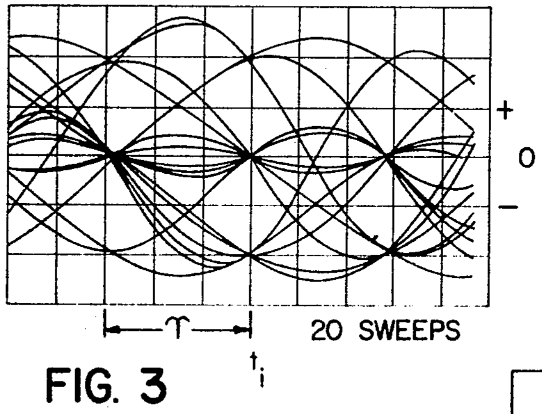
FIG. 3 is an illustration of superposed oscilloscope waveforms helpful to an understanding of this invention.

In FIG. 3 there is illustrated a pattern, which is referred to as an "EYE" pattern resulting from the observation of a random superposition of waveform symbols of the described type on an oscilloscope which has been synchronized by the clock signal. At a time, designated as $t_i$, the data signal has a value which should be able to be categorized as either a 0 or ±1. The EYE opening in the pattern has horizontal as well as vertical breadth, so that at times slightly removed from $t_i$, the amplitude signals may still be categorized readily as either a 0 or a ±1 depending upon the amplitude level which will be acceptable as defining a ±1. If the amplitude slicers are set, as indicated in FIG. 3, at the widest point of the EYE opening, then the maximum acceptable variation in the time of sampling $t_i$ may be tolerated. Stated otherwise, if the sampling time $t_i$ is maintained with close precision, the system can tolerate some distortion in the waveform, although that distortion tends to close the EYE opening both vertically and horizontally. Variations in phase linearity and non-uniform frequency response of the transducing chain including the stylus, the cartridge and the playback electronics, will tend to distort this pattern, thereby increasing the probability of an error in determining whether the signal at a specific clock sampling time is to be categorized as a 0 or a ±1.

Figure 4:
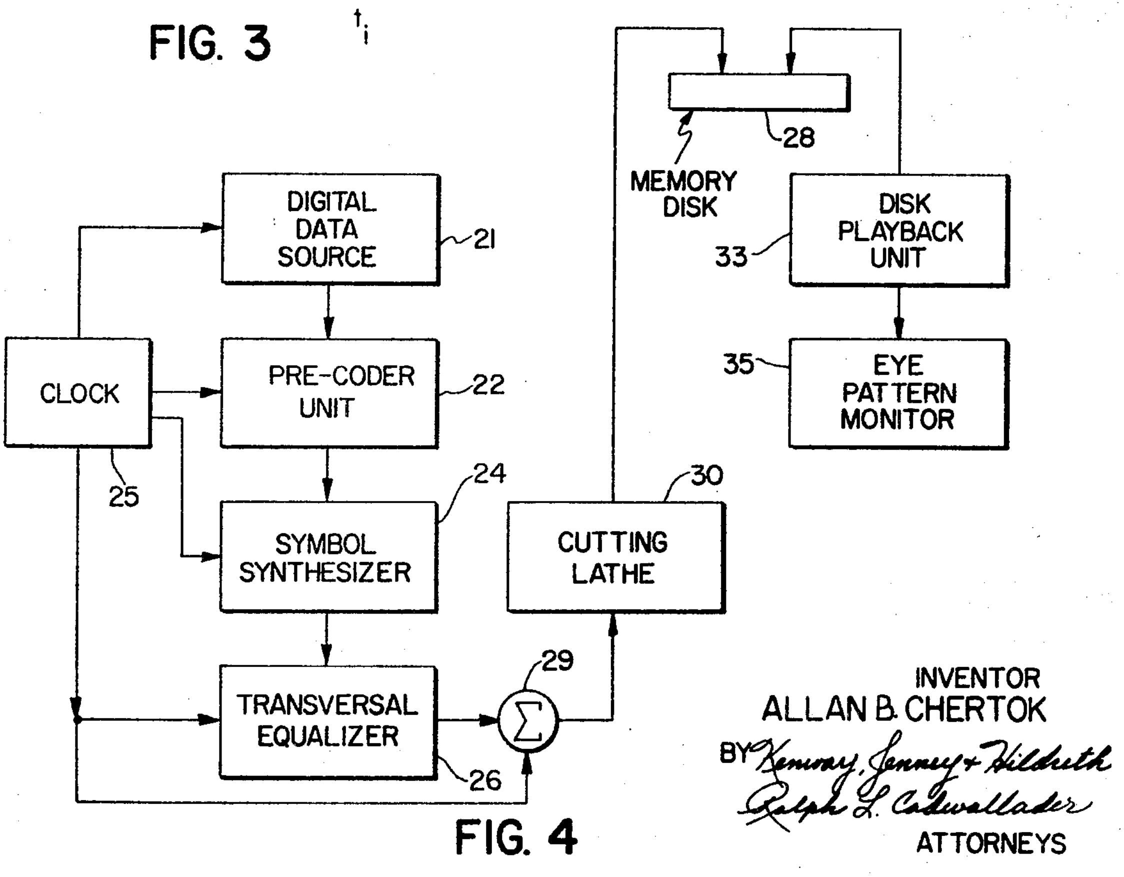
FIG. 4 is an illustration in block diagrammatic form of a signal processing system and cutting lathe suitable for the practice of this invention.

In FIG. 4 there is illustrated an apparatus for inscribing digital data on a memory disk. An apparatus of this type may be used to practice the method of the invention. In the apparatus of FIG. 4, a digital data source 21 provides output signals to a precoder unit 22, which in turn transmits signals to a symbol synthesizer 24. A clock 25 provides clocking pulses to the precoder unit 22, the digital data source 21, the symbol synthesizer 24, and a summing circuit 29. The data signals which are to be stored on the memory disk 28 are provided from digital data source 21. The data source may take any of several forms, for example, the data source might be a computer which can provide a digital data train in prearranged order. The precoder unit 22 and symbol synthesizer unit 24 are units to convert the purely digital signals coming from the digital data source 21 into appropriate waveforms for storage on the memory disk. Where the waveform symbol is to be the one described in pending application Ser. No. 788,441, the precoder unit 22 and symbol synthesizer 24 would have the form described in that application. In general, these units have the function of generating a waveform representing the digital data signals, which waveform is suitable for storing on the memory disk 28 and which can be readily decoded to regenerate the digital signal train upon readout from the disk.

The clock 25 provides clocking pulses to clock the transfer of the digital data from the source 21 to the precoder unit 22, for operation of the precoder unit 22 and to summing unit 29 to serve as a clocking signal to be inscribed on the disk. The output signals from the symbol synthesizer 24 are then in the form of a series of generally superposed waveforms having characteristics both for matching the requirements of inscribing the groove on the memory disk and also for being readily decoded to reconstitute the digital signal train. These output signals from the symbol synthesizer 24 are applied to a transversal equalizer 26 the output of which is summed at the summing unit 29 with the signal from the data rate clock 25 and the summed signals are applied to drive a cutting lathe 30, which operates to inscribe the record groove in the memory disk 28. In order to monitor the inscribing process, disk playback unit 33 may be employed. The disk playback unit is a stylus and cartridge read-out element of the same type that the system is designed to employ when a memory disk in use is to be read out. The electrical signal from the disk playback unit 33 may be applied to an EYE pattern monitor 35. The EYE pattern monitor may, for example, be an oscilloscope which displays the waveforms produced by the cartridge, with the sweep of the oscilloscope being synchronized by the clock pulses from the record disk 28. The cutting lathe 30 may be any conventional record master cutting lathe, a suitable example being a lathe manufactured by Scully Machine Works, Bridgeport, Connecticut with a Westrex Model 3D cutter and amplifier for stereo cutting, wired to cut lateral monaural without RIAA compensation.

The transversal equalizer 26 and the summing unit 29 will be described in detail below, however, the equalizer is, in essence, a tapped delay network which can be employed to combine leading and lagging echoes, in either polarity and with selected amplitudes with the undistorted waveform. The summing circuit is one which provides a combination of the clock sinusoid with the equalized electrical signal to drive the cutting lathe 30.

With the exception of the transversal equalizer 26 and the summing circuit 29 the configuration of the signal processing cutting units shown in FIG. 4 is conventional for the preparation of a digital storage disk of the type described in the previously cited pending applications. The transversal equalizer 26 performs the function of predistorting the electrical waveform which drives the cutting lathe 30 so that the physical modulations in the groove are such that the waveform produced by the playback unit is one which can be decoded with optium precision and accuracy.

In general the method of inscribing digital data onto a memory disk without the use of the transversal equalizer is one in which the clock 25 controls the release of data in digital form from the digital data source 21. This clock 25 is arranged to produce the data at the data rate $F_D$ and this released digital data is applied to the precoder unit 22 and symbol synthesizer 24 to generate a series of superposed symbols which serve as the electrical driving signals for the cutting lathe 30. The turntable of the cutting lathe 30 is rotated at the rotational speed at which the playback turntable will eventually be operated and the superposed series of symbols are converted into mechanical variations in the spiral groove inscribing by the cutting lathe 30. The method of generating replicated disks from the original master can be the conventional one in the record industry and the usual cutting lathe 30 provides for control of the pitch of the spiral groove.

As discussed previously there are a number of problems associated with this process with either the cutting process or the playback process or both introducing distortion into the electrical waveform produced by the playback stylus and hence the precision with which the digital data train can be reconstituted is adversely affected. Any attempt to compensate for this distortion by predistorting the waveforms produced by adjustment of the symbol synthesizer 24 in the opposite sense may introduce the problem that the variation of the waveform produced by the adjusted symbol synthesizer could introduce frequency components lying outside the normal bandwidth of the data spectrum, thereby raising the possibilities of introducing frequencies which cannot be adequately inscribed by the record cutting process or introducing frequencies which lie beyond the limits of the data band filter used to separate out the data signal from the clock signals. An additional problem in predistortion compensation arises in those circumstances when the cutting lathe is operated such that the speed of rotation of the turntable differs from the intended rotational speed of the playback turntable. Thus because of considerations of power limits, it may be convenient to inscribe the groove on the record at one half the rotational speed at which the record is intended to be played. In order to do this the data rate clock 25 is operated to produce digital data from the data source 21 at a rate $F_D/2$. Thus, when the record is played at twice the rotational speed during playback, the time rate of generation of the digital signals will be at the data rate of $F_D$. However, as indicated earlier, many of the distortion effects are frequency dependent, and accordingly, predistortions introduced into the symbol synthesizer 24 at a data rate of $F_D/2$ may well be inappropriate compensation for playback distortions introduced at a playback data rate frequency of $F_D$.

Since a transversal equalizer circuit is a linear network which cannot introduce any frequency components not already present, this technique provides for predistortion without introducing any problem of varying the frequency spectrum. In addition, as will become apparent from the description below of the detailed method for using a transversal equalizer circuit in the process of cutting a data record, a transversal equalizer circuit may be adjusted to introduce distortion on the basis of the playback frequency and yet may actually introduce the compensating distortions at a lower frequency when the cutting lathe is operated at a reduced rotational speed.

Figure 5:
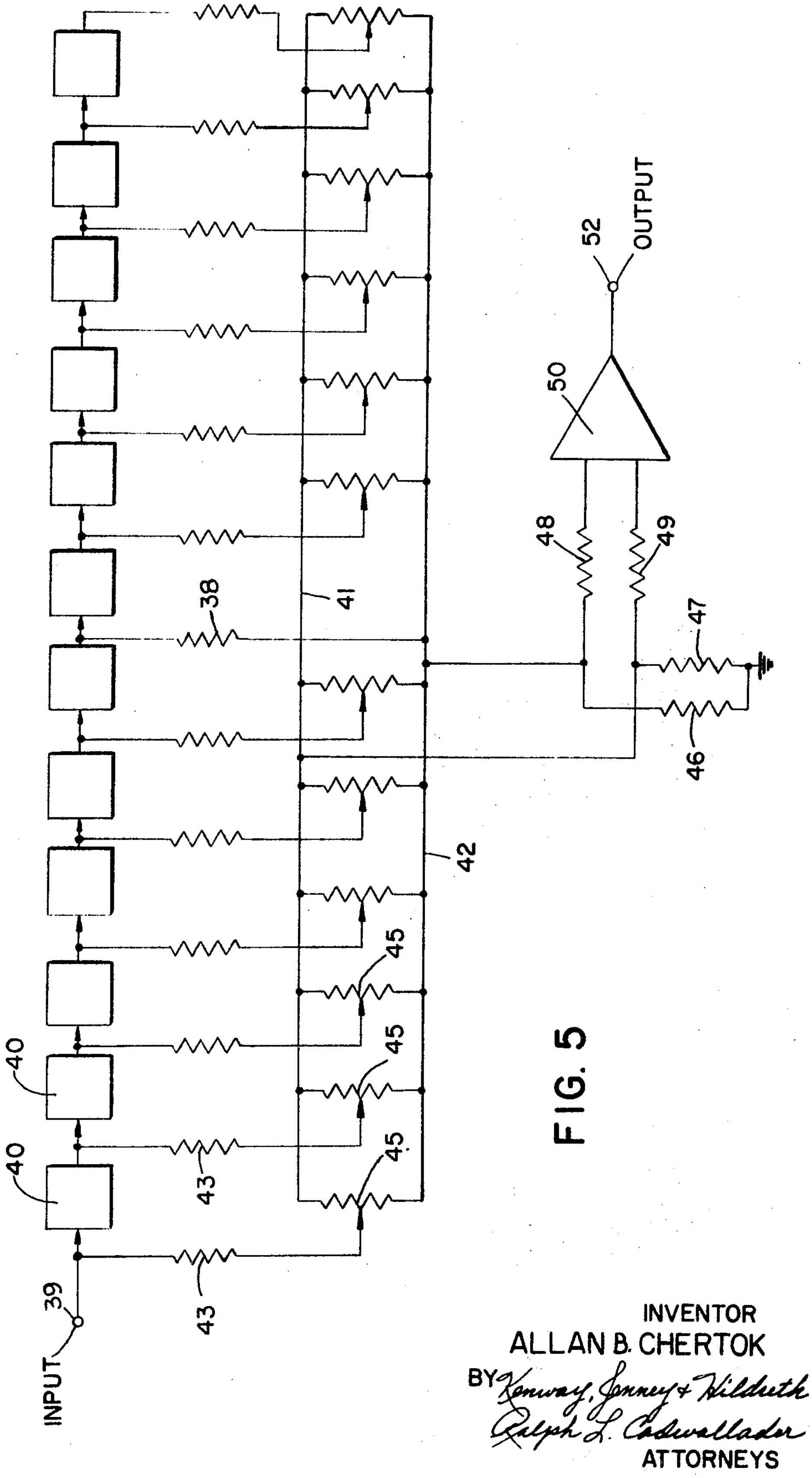
FIG. 5 is an illustration in block diagrammatic form of a transversal equalizer which may be employed in the practice of this invention.
Figure 6A:
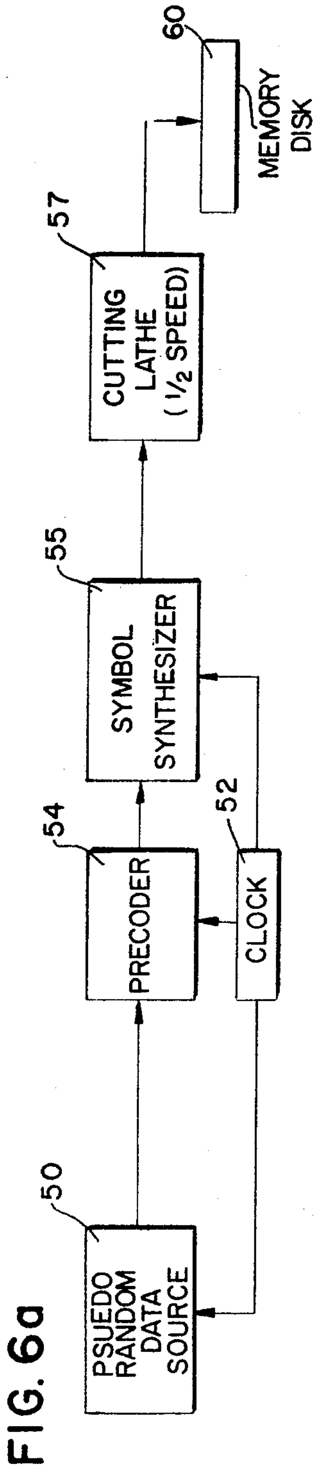
FIGS. 6*a*, 6*b* and 6*c* illustrate configurations of processing units suitable for implementing the first, second and third steps respectively of one preferred method for inscribing digital data on a record in accordance with the principals of this invention.
Figure 6B:
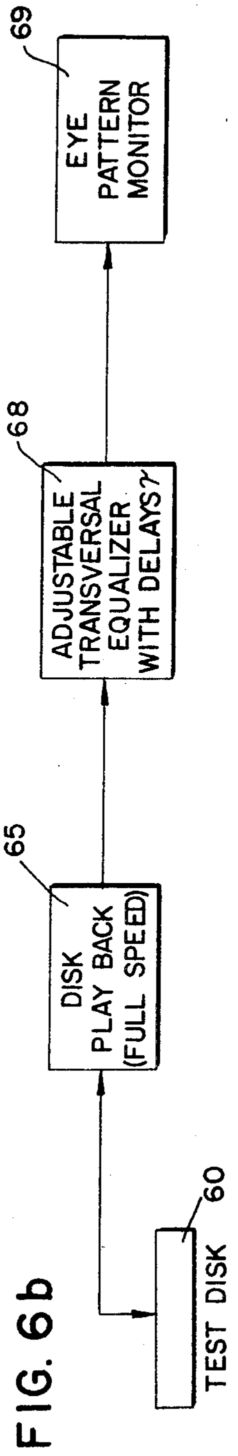
Figure 6C:
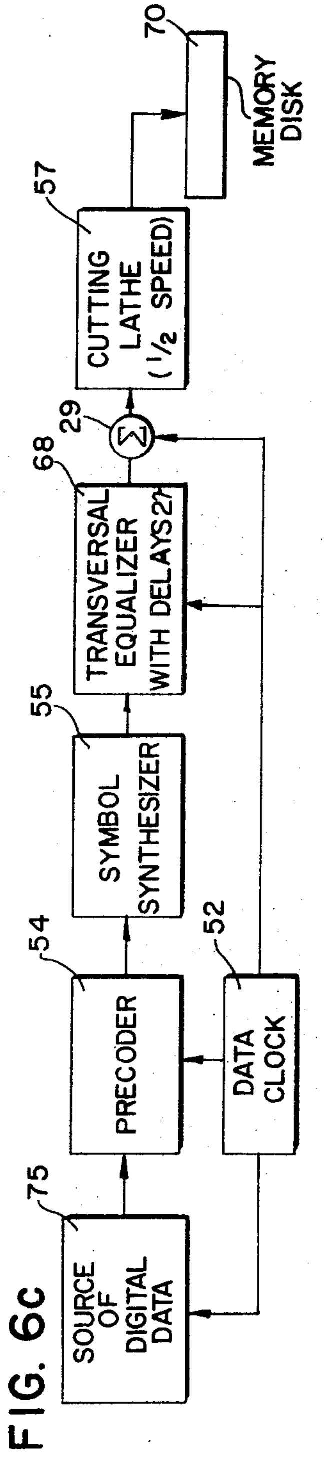

In FIG. 5 there is illustrated in block diagrammatic form one suitable construction of a transversal equalizer circuit. The transversal equalizer includes a series of delay line sections, 40, there being 12 such sections in the circuit shown. Each of the delay line sections introduces a time delay to signals applied to the input 39, the delay for each section equaling the signaling interval $\tau$. The output from each of the delay line sections 40 is applied to the input of the next sequential one of the delay line sections. Each of these outputs, except the output from the sixth delay line section is also applied through its associated coupling resistor 43, to one of the series of potentiometers 45. Each of the potentiometers 45 are connected in parallel with each other, one side of the potentiometers being connected through negative bus 41 to one input of a summing amplifier 50, with the other side of the parallel combination of potentiometers being connected through positive bus 42 to the other input of the summing amplifier 50. The output from the sixth delay section is applied directly through resistor 38 to bus 42. The output terminal 52 of the summing amplifier 50 serves as the output of the circuit. Bus 41 is also coupled to ground through resistor 47 which has a relatively low impedance value compared to that of resistor 49. Bus 42 is coupled to ground through an identical resistor 46. If each of the potentiometers 45 is set at its center position then the current supplied to bus 41 is identical to that supplied to bus 42 and since these are offsetting, the only contribution is from the center tap. Thus, under these conditions the waveform of the electrical signal appearing at output terminal 52 is identical to the waveform which was applied to the input terminal 39. If, however, the potentiometers between the various delay line sections are changed from their center positions then the amount and direction of displacement will determine the amplitude and polarity of the echo introduced in each time position and the waveform appearing at the output terminal 52 will be a distorted version of that applied to the input terminal 39. A description of an equalizer operating on these general principals is given in the report in the proceedings of the IEEE dated January, 1965, Page 96 by F. K. Becker et al.

For a particular waveform applied to the input terminal 39, then, a waveform may be produced at the output terminal 52 which includes controlled distortions of the waveform applied to the input terminal 39. These distortions may be controlled by varying the settings of the various potentiometers 45. If the signal waveform applied to the input 39 has a particular frequency characteristic and if it is subsequently desired to introduce the same controlled distortion to a signal of the same waveform with a frequency characteristic of the same shape, but at a greater or lesser bandwidth, which corresponds to a proportional increase or decrease of data rate, this same distortion may be introduced by substituting for the original delay line section 40 a new delay line. The new delay line should have the same number of sections, but the delay in each section of the new delay line must bear the same relationship to the delay introduced by the sections of the original delay line, as the frequency of the subsequent introduced waveform bears to the frequency of the original waveform. Under these circumstances the same distortion in the waveform will be produced at the output terminal 52 for the waveform of different frequencies as was originally introduced by adjusting the potentiometers 45 for the original waveform.

In FIGS. *6a*, *6b* and *6c* there are illustrated configurations of the units in the system for inscribing a groove on the record, which configurations introduce compensating distortion to the signal used to control the cutting lathe and yet allow the cutting lathe to be operated such that the turntable is rotated at one-half the rotational speed at which the produced record will rotate for playback purposes. In the first step, as illustrated in FIG. *6a*, a source of pseudo random digital data 50 is employed to generate a data stream, upon demand, by the clock 52 which is operated at a data rate $F_D/2$. The digital signals produced from the pseudo random data source 50 are applied to precoder 54, which controls the generation of symbols from the symbol synthesizer 55. The symbol synthesizer 55 may be one generating a waveform having the time and frequency characteristics described earlier. The output from this symbol snythesizer 55 is used to drive a cutting lathe 57 which operates such that the turntable rotates at one half the speed intended for playback of the disk. This cutting lathe 57 is used to inscribe the spiral groove containing transverse modulations representing these superposed series of electrical signals from the symbol synthesizer 55. The resultant test disk 60 is one which has inscribed on it signals representing a pseudo random order of digital data.

In the second step, illustrated in FIG. *6b*, the test disk 60 is played back on a full speed disk playback unit 65 which is a standardized type which will be used to retrieve the stored digital data from a memory disk in normal operation. The output from the disk playback unit 65 is an electrical signal representing the modulations in the groove on the test disk converted by the cartridge and playback electronics to an analog electrical signal. This signal has the general form of the EYE pattern illustrated in FIG. 3. In this step there is no decoder operating on the output signal from the playback unit 65 and hence the digital data train is not reconstituted. The output from the disk playback unit is then a series of superposed signals of the waveform produced by symbol synthesizer 55, distorted by its processing through the cutting lathe 57 and the disk playback unit 65. Since the pseudo random data was generated at a data rate of $F_D/2$ and inscribed on a disk rotating at one half full speed, then the frequency of the data signal produced by the disk playback unit 65 from the same disk 60 rotated at full speed, is $F_D$. This output signal from the disk playback unit 65 is transmitted through the adjustable transversal equalizer 68 to the EYE pattern monitor 69. The adjustable transversal equalizer 68 is generally of the form shown in FIG. 5 and each section has a delay equal to $\tau$. The monitor 69 is observed visually and the EYE pattern may be optimized by manual adjustment of the potentiometers for each of the stages in the adjustable transversal equalizer 68.

Once the EYE pattern has been optimized, the third step of the process may be carried out. In the third step the source of digital data 75, which may be data from a computer to be inscribed on a memory disk, is supplied on a time basis controlled by clock 52 to precoder 54 and symbol synthesizer 55 and the analog signal produced by synthesizer 55 is applied through the adjusted linear transversal equalizer 68 to the cutting lathe 57, operated at one half speed. The clock 52 again times the data from the source of digital data 75 at a data rate $F_D/2$ and also applies this clock signal to the summing unit 29 so that it is recorded on the disk together with data signals. The adjustments in the linear transversal equalizer 68, which were made in the previous step, remain. However, a delay line in which each section has a delay $2\tau$ is substituted for the original delay line. The electrical signal driving the cutting lathe 37 in this step has then been distorted such that the mechanical modulations in the inscribed groove represent a distorted electrical waveform which, upon playback at twice the rotational speed, will produce an optimized EYE pattern.

Figure 7A:
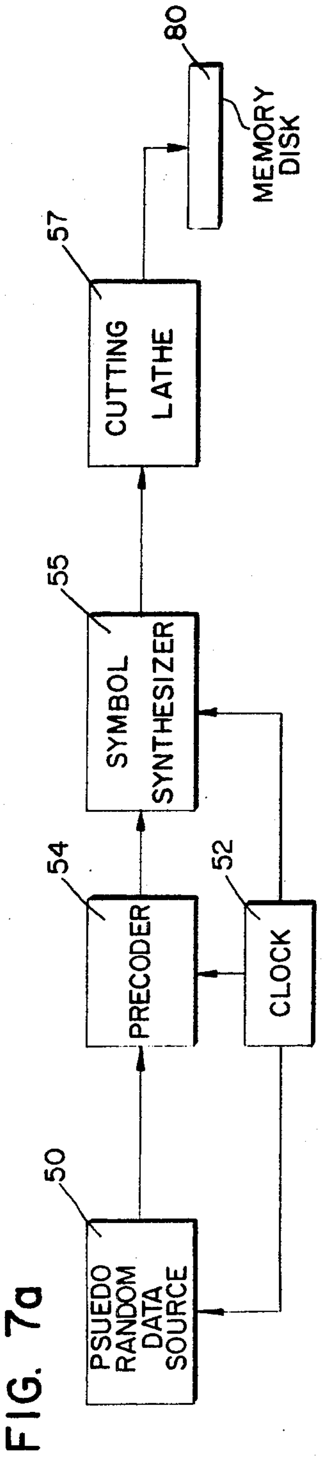
FIGS. 7*a*, 7*b* and 7*c* represent configurations of processing units suitable for the implementation of the first, second and third steps respectively of a second preferred method for inscribing digital data on a record disk in accordance with the principals of this invention.
Figure 7B:
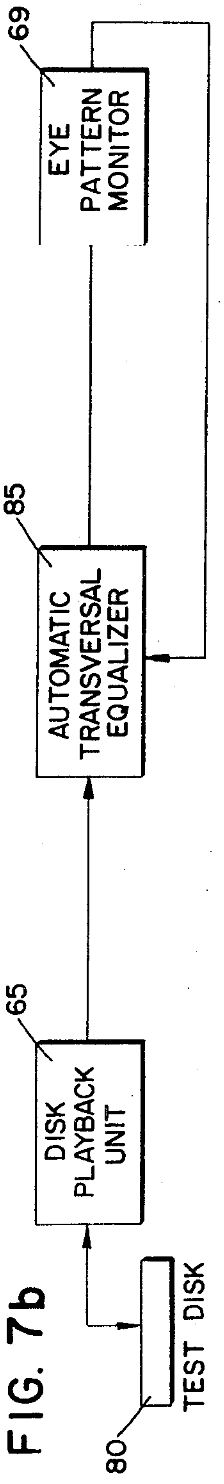
Figure 7C:
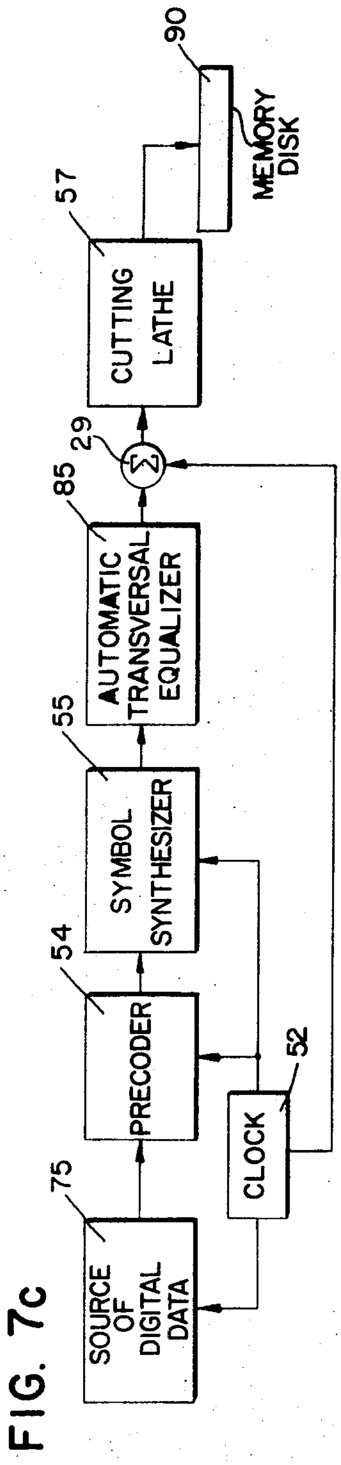

In FIGS. **7*a*, 7*b* and 7*c* there is illustrated a second three step process for inscribing digital data signals on a record medium in accordance with the method of this invention. In this process the turntable in the cutting lathe rotates at the same speed as the turntable in the playback unit, however, it will be understood that the process could be used where these velocities are different by employing the substituted delay line, described in the previous process. In the initial step, illustrated in FIG. 7*a*, a pseudo random digital data source 50 is clocked by clock 52 to provide digital data in a pseudo random sequence to precoder 54 and thence to symbol synthesizer 55, providing as in the previous method a series of output signals for driving the cutting lathe 57 to inscribe the modulated groove on the memory disk 80. In this step, however, the turntable in the cutting lathe is rotated at the same speed as the turntable in the playback apparatus and accordingly the clock 52 clocks the pseudo random data source 50** at the data rate $F_D$.

In the second step illustrated in FIG. **7*b*, the test disk 80, prepared in the preceding step, is played back through a standard playback unit 65 and the output analog electrical signal from the playback unit 65 is applied to an automatic transversal equalizer 85. The output of the automatic transversal equalizer is applied both to an EYE pattern monitor 69 and is also applied as a feedback signal to a control point in the automatic transversal equalizer to provide for automatic adjustment of this unit. An automatic transversal equalizer, such as that shown at 85**, is a transversal equalizer in which the adjustment to the various taps from the delay line is made automatically by a signal processor and control unit within the instrument, the signal processor and control unit having been programmed to optimize the equalizer output according to a predetermined algorithm.

Figure 8:
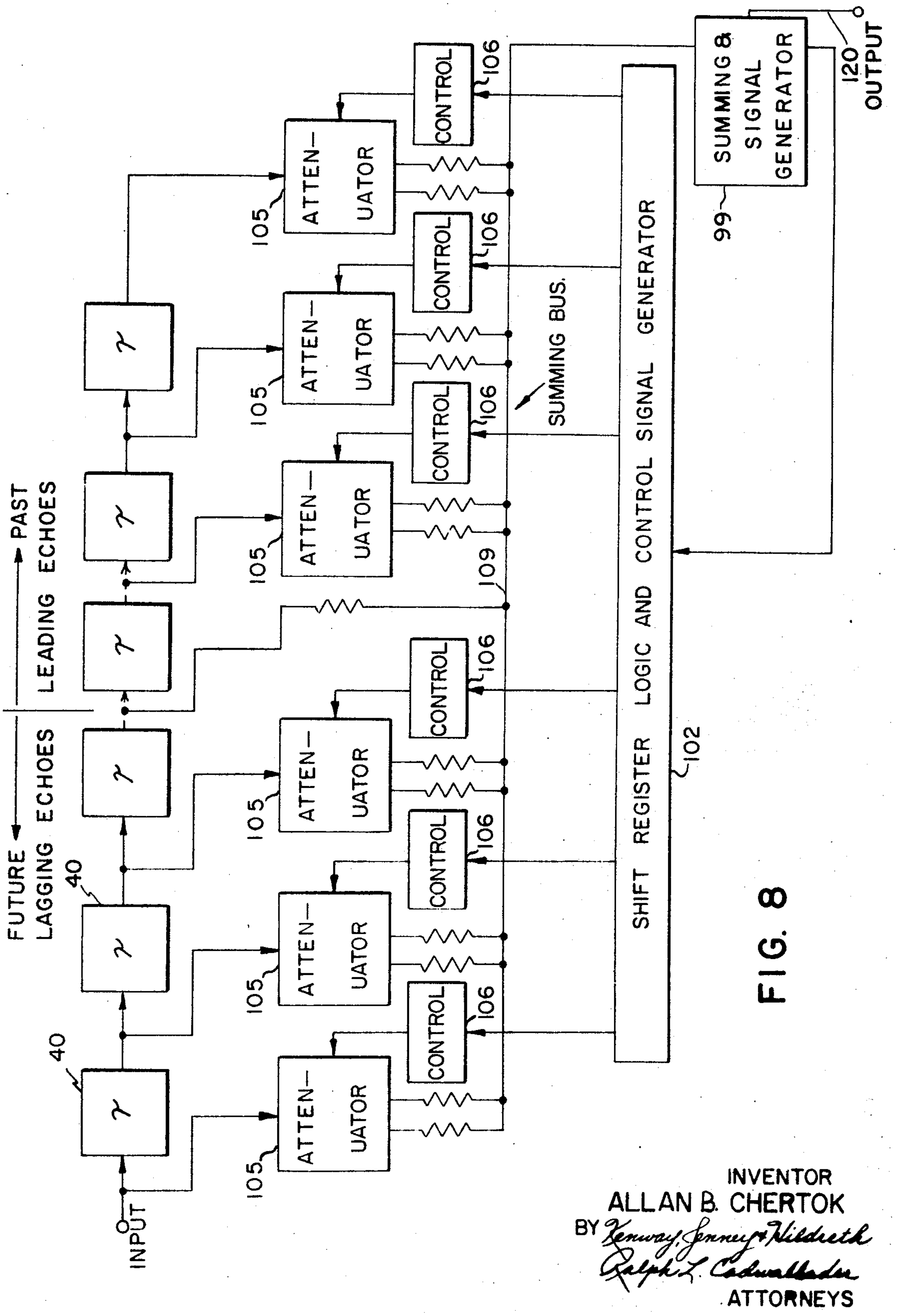
FIG. 8 is an illustration in block diagrammatic form of an automatic transversal equalizer useful in the practice of this invention.

A general block diagram of an automatic equalizer is illustrated in FIG. 8, in which the output from each one of the serially connected delay line sections 40 is applied through a series of attenuating networks 105 to a summing and signal generating circuit 99 and the equalized output is provided at an output terminal 120 from this summing and signal generating circuit. As in the manually adjustable equalizer each section is one signaling interval, $\tau$, long, where $\tau = 1/F_D$, $F_D$ being the data rate. The adjustable bipolar attenuators 105 serve the purpose of the potentiometers 45 in the transversal equalizer in FIG. 5, that is, they provide for adding to the waveform an adjustably attenuated portion of the signal contributed from the corresponding section of the delay line and for controlling the polarity of the added portion. However, these attenuators 105 may be automatically adjusted to vary the attenuation factor and polarity. Each attenuator 105 is controlled by an associated control circuit 106 which receives programmed control signals from the control signal generator 102.

Figures 9, 10:
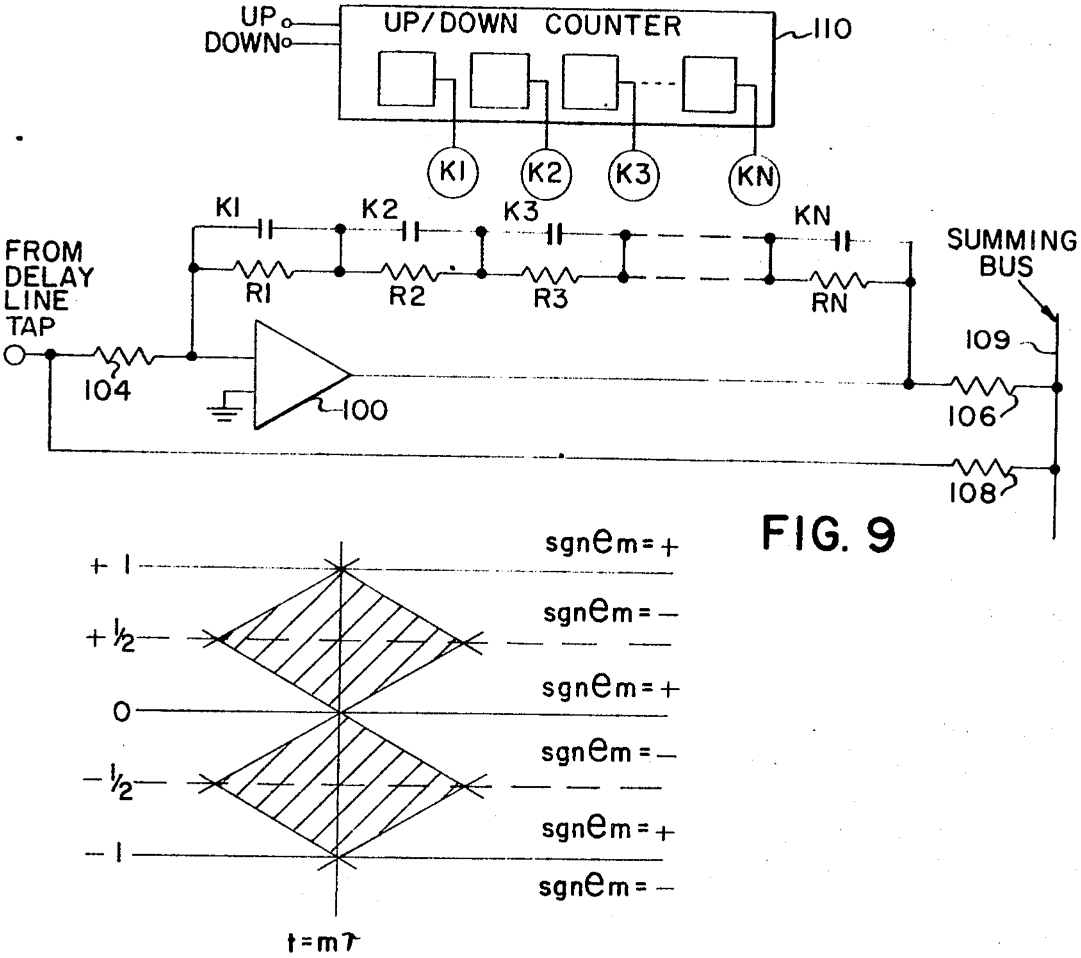
FIG. 9 is an illustration in block diagrammatic form of an attenuator stage useful in the circuit of FIG. 8.
FIG. 10 is an illustration in diagrammatic form of a portion of a response signal pattern showing the assignment of logic threshold levels and signal distortion polarities.

In FIG. 9 there is illustrated a suitable form of attenuator for each stage of the transversal equalizer illustrated in FIG. 8. The attenuator includes an operational amplifier 100 which is provided with a feedback network of binary weighted resistors R1, R2, R3, etc. A series of associated reed relays, $K_1$, $K_2$, $K_3$, etc., controlled by up-down binary counter 110, shunt their associated resistors and thereby set the amplifier 100 gain to any one of $2^N$ values. Prior to adjusting the equalizer, the counter 110 is reset to a mid-scale count (127 or 128 for an eight bit counter). For this count state the feedback resistance around the amplifier 100 is equal to the feedback value of feedback resistor 104 and the amplifier, under these conditions, provides unity inverting gain. Thus the voltage applied to resistor 106 is equal in value and opposite in polarity to that applied to resistor 108 and no net current is delivered to the summing bus 109.

If, using this circuit, it is desired to add an echo in the positive sense, the counter 110 is displaced by down commands to effect a decrease in amplifier gain and thereby cause a non-inverted net signal current to be driven into the summing bus. An echo in the inverted sense is added by incrementing the counter 110 in the up direction.

Each of these attenuator stages have up or down commands applied in response to the operation of a programmer subsystem, which detects the presence of distorting echoes in the equalizer output, determines their polarity and distance in time from respective parent symbols, then issues the appropriate up-down command. These corrective echoes are administered in small fixed amounts rather than in proportion to the magnitude of the distorting echo, thereby permitting this program implementation to be carried out by binary logic elements. The equalizer will then run through several cycles until the output has driven each attenuator to its proper value. After this stabilized condition is achieved the feedback is disabled so that the equalizer operates without further adjustments of the attenuator.

In the final step of the process, illustrated in FIG. **7*c*, the source 75 of digital data to be inscribed on a memory disk 90 is clocked at the data rate $F_D$ from clock 52 and provides an output train of digital signals to the precoder unit 54 and the symbol synthesizer 55. These units provide as an output from the symbol synthesizer 55 an analog signal representing the superposed series of symbols. This signal is transmitted through the automatic transversal equalizer 85 with the adjustments made in the preceding step being maintained. The output waveform from the automatic transversal equalizer 85 is combined in the summing circuit 29 with a clock sine wave at the data rate $F_D$ and applied as the driving signal to the cutting lathe 57, operating at full rotational speed. The modulated groove inscribed by this process on the memory disk 90** has, then, a predistortion such that the optimum EYE pattern is produced from a playback from the memory disk on a standard playback unit.

The particular configuration of the automatic transversal equalizer logic in the signal processor section will depend upon the particular symbol waveform selected. For the symbol waveform described in Patent application Ser. No. 788,441, a suitable algorithm developed at Bell Telephone Laboratories, Holmdel , New Jersey for adjustment of the $n^{th}$ tap gain to the EYE pattern has been found to be;

$C_n = (\text{Sgn echo}_m)\ \text{Sgn}\ Y_{(m-n)}$ where Sgn $\text{echo}_m = +$ if Sgn $e_m = -$ ;—if Sgn $e_m = +$ and 0 if $[\text{Sgn}\ e_m + \text{Sgn}\ e_{(m-2)}]^{-}0$, and where Sgn $e_m$ is the error polarity at time, $t = m\tau$;
Sgn $y_{(m-n)}$ is the polarity of the waveform at $t = (m_-n)\tau$, and
Sgn $Y$
$= +1$ when $Y > 0$
$= 0$ when $Y = 0$
$= -1$ when $Y < 0$ If the value of $C_n$ is positive, then the gain of the $n^{th}$ tap is incremented in the positive sense; if the value is negative, then the gain is incremented in the negative sense.

In FIG. 10 there is illustrated in graphical form the basis for determining the polarity of the term Sgn $e_m$. The EYE pattern, a portion of which is illustrated, is amplitude sliced at time $t = m\tau$ to determine the polarity of this term.

In the algorithm for $C_n$ the term Sgn echo $_m$ is utilized to provide the necessary conditions that a correcting control action only be initiated when there is present an error of one polarity at time $t = m\tau$ and of the opposite polarity at time $t = (m-2)\tau$. Thus if the error at $t = m\tau$ is negative and that at $t = (m-2)\tau$ is positive, this indicates the presence at time $t = m\tau$ *of a normal sense distorting echo centered at time* $t = (m-1)\tau$. A pair of errors of the opposite polarity would indicate the presence of an inverted echo centered at time $t = (m-1)\tau$. If, on the other hand, the errors at time $t = m\tau$ and time $t = (m-2)\tau$ are of the same polarity no corrective action is initiated.

If, according to the algorithm, the Sgn $Y_{(m-n)}$ is not equal to zero, indicating a symbol at time $t = (m-n)\tau$, and a normal sense echo is detected subsequentially at $t = m\tau$, the appropriate corrective action calls for the addition of an echo of opposite sense lagging the parent symbol by $n$ clock periods. The required echo is provided by a tap, $n$ clock periods to the left of the center tap. If Sgn $Y_{(m-n)}$ is negative, the parent symbol is of normal sense and the required inverted sense corrective echo will be provided if the attenuator of tap $n$ is incremented in the negative sense. Conversely if Sgn $Y_{(m-n)}$ is positive, the appropriate correction is provided by incrementing the tap gain in the positive sense.

Figure 11:
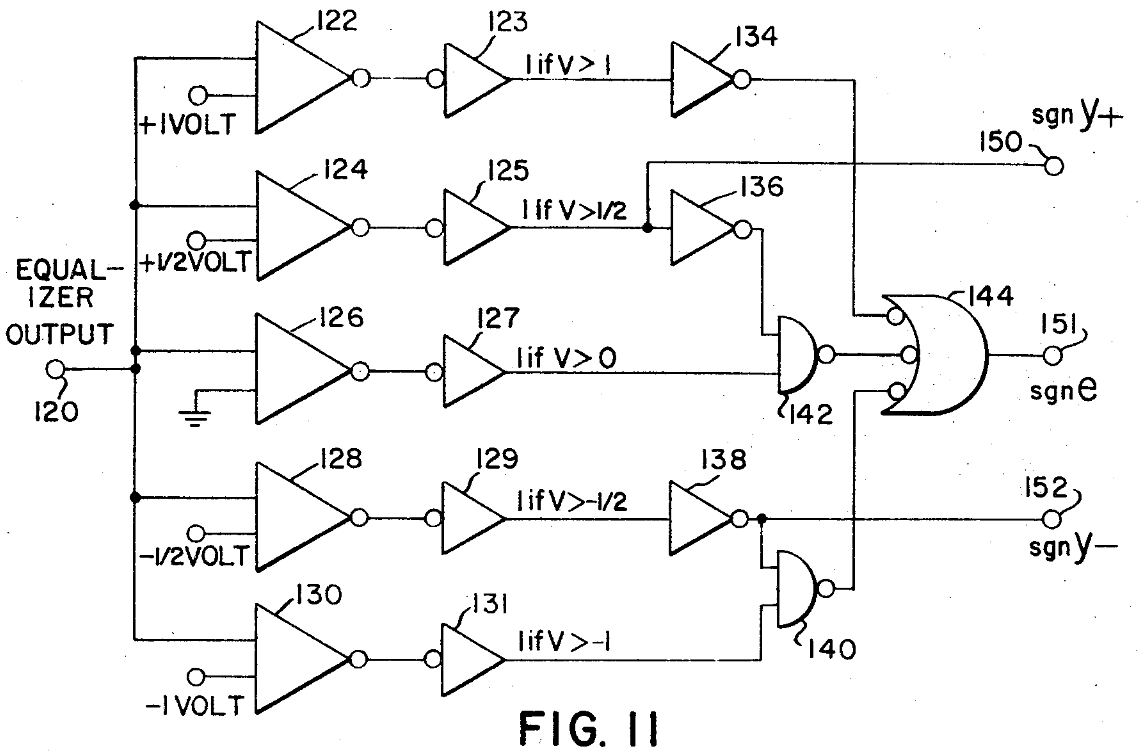
FIG. 11 is an illustration in block diagrammatic form of an amplitude slicing circuit useful in the practice of this invention.

In FIG. 11 there is illustrated an amplitude slicing circuit providing the appropriate polarity output signals for Sgn $Y$ and Sgn $e$. This network includes a series of level slicers 122, 124, 126, 128 and 130, each having an associated buffer, 123, 125, 127, 129 and 131 respectively. Each slicer provides, through its associated buffer, an output signal which has a value of one if the equalizer voltage applied to terminal 120 is greater than its respective reference voltage and a zero if the equalizer voltage is less than its respective reference voltage. The output from buffer 123 is provided through an inverter stage 134 as one input to OR gate 144. A second input to this OR gate 144 is provided at the output from NAND gate 142, which has applied to its input the output from buffer 125 through inverter 136, and the output directly from buffer 127. Similarly a third input to the OR gate 144 is provided from a second NAND gate 140 which has as its inputs the signal directly from buffer 131 and the signal from buffer 129 through inverter stage 138. The output from inverter stage 138 is also taken directly as an output 152 designated Sgn Y−. The output at terminal 151 from OR gate 144 is designated Sgn $e$. An output directly from the buffer stage 125 is provided through terminal 150 as the Sgn Y+ output.

With this network the value of the output signal Sgn $e$ is + if: $V > 1$; or $V > 0$ and $V < ½$; or if $V < -1$ and $V < -½$.

Under all other circumstances Sgn $e$ is negative.

Figure 12:
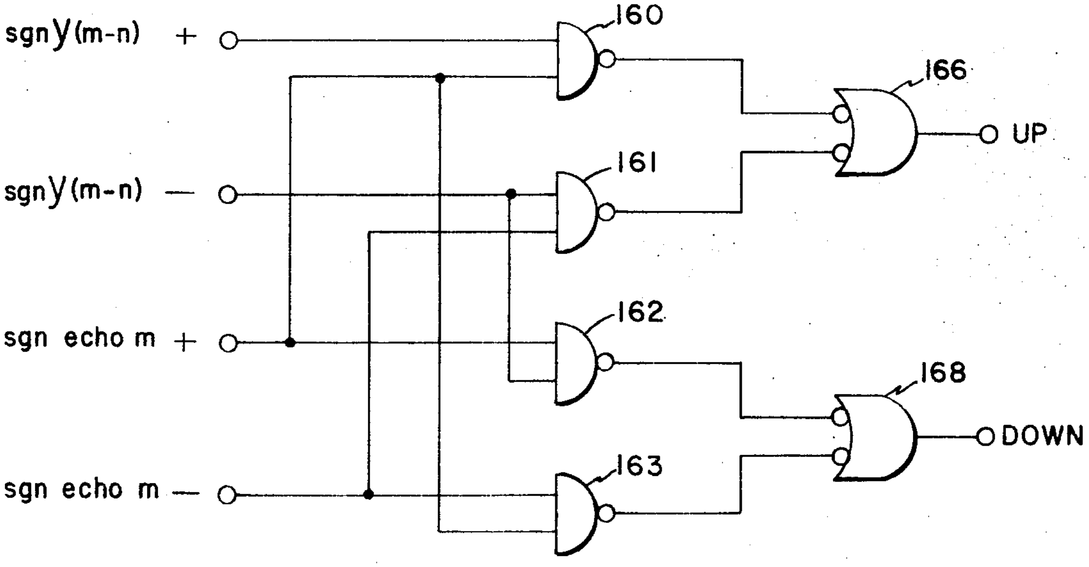
FIG. 12 is an illustration in block diagrammatic form of a logic control circuit for use with each attenuator in FIG. 8.

In FIG. 12 there is illustrated a control system for providing the up-down signals to the up-down counter 110 of each of the attenuators. One of these controllers is provided for each of the attenuators. In the network illustrated in FIG. 12, the input terminals to the network carry the signals;

Sgn $Y_{(m-n)}$+, Sgn $Y_{(m-n)}$−
Sgn echo $_m$ + and Sgn echo $_m$−.

The network consists of four NAND gates 160, 161, 162 and 163, with the output from NAND gates 160 and 161 being provided as inputs to OR gate 166 and the output from OR gate 166 providing the "up" signal. Similarly, the outputs from NAND gates 162 and 163 are provided as inputs to OR gate 168 and the output from this gate is the "down" signal. The logical arrangement of the circuit illustrated in FIG. 12 is such that it effectively implements the algorithm for corrective action described earlier.

Figure 13:
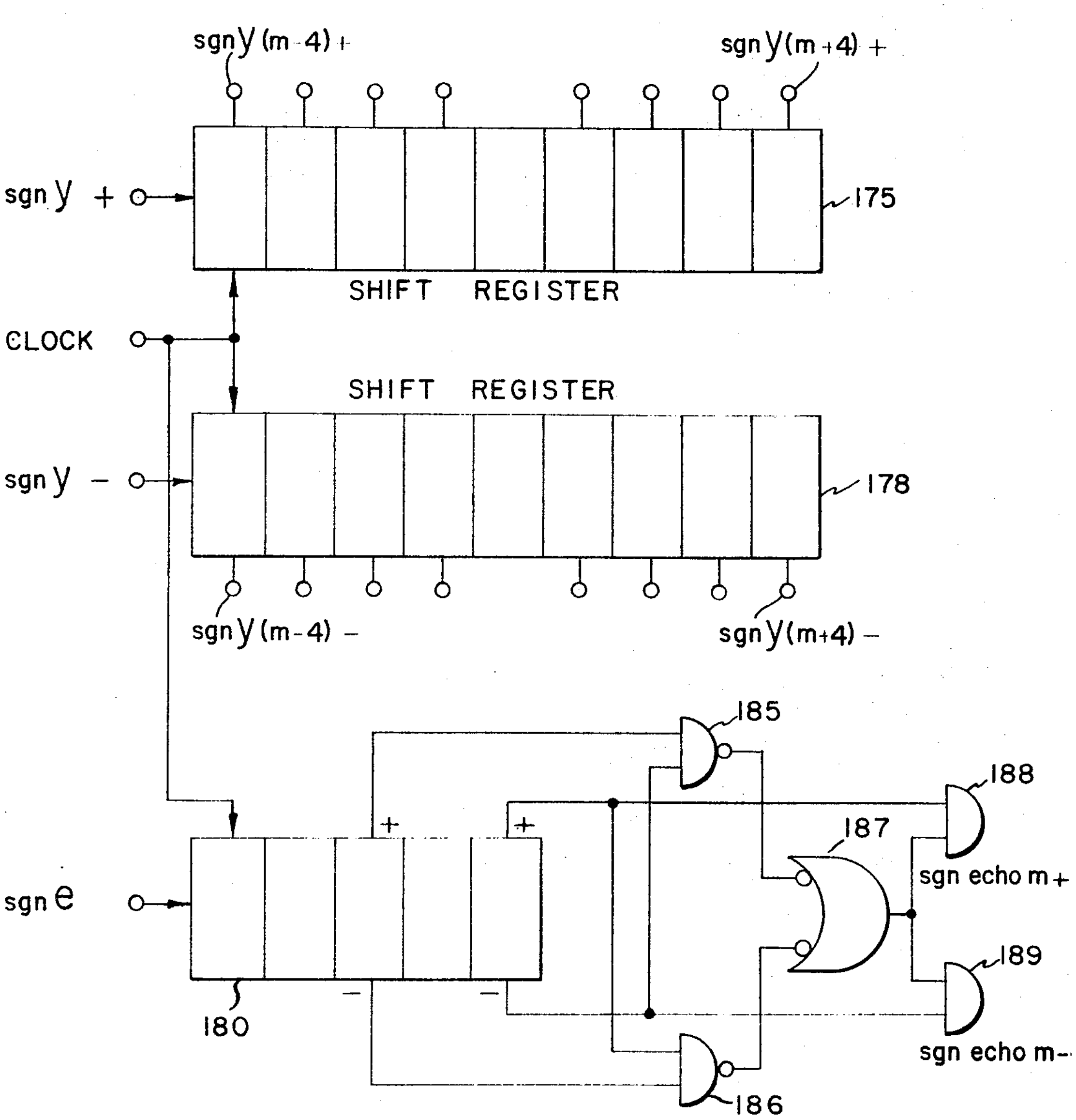
FIG. 13 is an illustration in block diagrammatic form of a shift register network useful in providing signals to each of the attenuator control stages shown in FIG. 12.

In FIG. 13 there is illustrated a shift register arrangement which provides for Sgn $Y$ signals for each tap gain controller and for Sgn echo $_m$ + and Sgn echo $_m$− signals. The shift register arrangements illustrated in FIG. 13 are for the situation where $N = 4$, that is where there are four delay line taps provided on each side of the center tap in the equalizer. In this arrangement the Sgn $Y$+ is provided as the input signal to a nine stage shift register 175, while the signal Sgn $Y$− is provided as the input signal to a nine stage shift register 178. The number of stages in each of the shift registers 175 and 178 is established as $1 + 2N$ and it is noted that the output from the first stage is applied as the Sgn Y+ input to the tap control at the position ($m$=4), corresponding to the fourth tap to the left from the center tap while the output from the ninth stage of the shift register 175 is applied as the Sgn Y + signal to the fourth tap control to the right of the center tap. In similar fashion the outputs from each of the stages of shift register 178 are applied to a Sgn $Y$ − input of the appropriately positioned tap controllers.

The third shift register 180 in the network illustrated in FIG. 13 is a five stage shift register, that is it has $1 + N$ stages. This shift register 180 has coupled to it logic elements to provide for the appropriate Sgn echo $_m$ + and Sgn echo $_m$ − signals so that these signals are provided only when the signals Sgn $e$, from the apparatus illustrated in FIG. 11, are opposite in polarity at times two signal intervals apart. Thus one NAND gate 185 is provided with input signals from the positive rail output of the third stage of the shift register 180 and from the negative rail output of the fifth stage. A second NAND gate 186 is provided with input signals from the positive rail output of the fifth stage and the negative rail output of the third stage. The outputs from NAND gates 185 and 186 are provided as inputs to OR gate 187, the output of which is an enabling signal to one of the input legs of each of the AND gates 188 and 189. The other input to NAND gate 188 is directly from the positive output of the fifth stage and the output signal from this AND gate 188 is Sgn echo $_n$+. The other AND gate 189 has its second input directly from the fifth stage negative output and the output from this AND stage 189 is Sgn echo $_m$ −. With this arrangement the Sgn echo signal is delayed N clock intervals, and thus Sgn $Y$ signals lead or lag this signal by 1 through N clock periods.

While the embodiment has been described in terms of a specific logic implementation of a specific algorithm for the waveform described, it will be understood that for the same waveform other logic implementations may be employed to achieve the same algorithm. Similarly, it will be understood that in the overall method employing automatic equalization, different waveforms may be employed in some digital data inscribing systems and appropriate algorithms and logic implementations for these waveforms will be available.

I claim:

1. A method for generating an electrical driving signal for controlling a cutting lathe to inscribe a modulated spiral groove representing an ordered sequence of digital data on a record disk intended to be read out by a standardized phonograph, cartridge and decoding circuit, comprising the steps of:
providing a clocking pulse train;
generating at regular intervals determined by said clocking pulse train, a series of identical waveform symbols of predetermined characteristics to represent said digital data; said waveform being such that it may be decoded by determining the amplitude at specific sampling times occurring at said regular intervals to reproduce with precision said ordered sequence of digital data; and
passing said series of generated electrical symbols through a transversal equalizer to said cutting lathe, said transversal equalizer having been adjusted to vary the amplitude of portions of said waveforms over a plurality of said regular intervals such that the waveform reproduced from an inscribed record disk by the standardized phonograph cartridge is substantially the same as said generated electrical symbols.

2. A method in accordance with claim 1 wherein said transversal equalizer is in the form of a series of delay sections, each section having a time delay, T, and each except the center section having an adjustable attenuator connected to a summing output.

3. A method in accordance with claim 2 wherein said equalizer is adjusted by the steps of:

inscribing a modulated spiral groove on a test disk from a pseudo random source of digital data by controlling said cutting lathe directly with said generated symbols;

reproducing the waveforms inscribed on said test disk through a standardized phonograph cartridge and passing the reproduced signals through said adjustable equalizer and adjusting the attenuators to make the output waveform at said summing junction substantially the same as said generated electrical symbols.

4. A method for generating an electrical driving signal for controlling a cutting lathe operating at a first rotational speed to inscribe a modulated spiral groove representing an ordered sequence of digital data on a record disk intended to be read out by a standardized decoding circuit and phonograph operating at a second rotational speed, said second rotational speed being a fixed factor faster than said first rotational speed, comprising the steps of:

providing a clocking pulse train;

generating at regular intervals, T, determined by said clocking pulse train, a series of identical waveform symbols of predetermined characteristics to represent said digital data; said waveform being such that it may be decoded by determining the amplitude at specific sampling times occurring at regular intervals to reproduce with precision said ordered sequence of digital data; and passing said series of generated electrical symbols through a transversal equalizer to said cutting lathe, said transversal equalizer including a series of delay sections each having a time delay equal to T, and each except the center one having an adjustable attenuator connected to a summing output junction, said adjustable attenuators having been adjusted by:

inscribing a modulated spiral groove on a test disk from a pseudo random source of digital data by generating a series of said waveform symbols to represent said pseudo random digital data and controlling said cutting lathe directly from said generated symbols;

reproducing the digital data inscribed on said test disk through a standardized phonograph operating at said second rotational speed and passing the reproduced signals through an equalizer formed from a series of delay sections having a delay time equal to T divided by said fixed factor, with each section connected to the adjustable attenuators of the first mentioned equalizer and adjusting the attenuators to make the shape of the output waveform at said summing junction substantially the same as said generated electrical symbols.

5. A method in accordance with claim 5 wherein said fixed factor is 2.

6. A method for generating an electrical driving signal for controlling a cutting lathe to inscribe a modulated spiral groove representing an ordered sequence of digital data on a record disk intended to be read out by a standardized phonograph cartridge and decoding circuit, comprising the steps of:

providing a clocking pulse train;

generating at regular intervals, T, determined by said clocking pulse train, a series of identical waveform symbols of predetermined characteristics to represent said digital data; said waveform being such that it may be decoded by determining the amplitude at specific sampling times occurring at said regular intervals to reproduce with precision said ordered sequence of digital data; and passing said series of generated electrical symbols through a transversal equalizer to said cutting lathe, said transversal equalizer having been adjusted to vary the amplitude of portions of said waveforms over a plurality of said regular intervals, said transversal equalizer being in the form of a series of delay sections, each section having a time delay, T, and each except the center section having an adjustable attenuator connected to a summing output junction;

said equalizer having been adjusted by the steps of:

inscribing a modulated spiral groove on a test disk from a pseudo random source of digital generating data by controlling said cutting lathe directly with said generated symbols; and reproducing the waveform inscribed on said test disk through a standardized phonograph cartridge and passing the reproduced signals through said adjustable equalizer, each of the attenuators having been adjusted by application of a testing algorithm to the relative amplitudes of portions of the waveform.

7. A method in accordance with claim 6 wherein said testing algorithm is such that said attenuators are only adjusted when the waveform amplitudes are such that a portion of the waveform located a specific number of sections before the center section has an amplitude error opposite in polarity to an amplitude error occurring an equal number of delay sections after said center section.

* * * * *